United States Patent
Takeuchi et al.

(10) Patent No.: US 6,898,024 B2
(45) Date of Patent: May 24, 2005

(54) OPTICAL SYSTEM FOR OPTICAL PICKUP EMPLOYING COMA COMPENSATING ELEMENT

(75) Inventors: Shuichi Takeuchi, Saitama-ken (JP);
Koichi Maruyama, Tokyo (JP);
Takeshi Shimano, Saitama-ken (JP)

(73) Assignees: PENTAX Corporation, Tokyo (JP);
Hitachi, Ltd., Tokyo (JP)

( * ) Notice: Subject to any disclaimer, the term of this patent is extended or adjusted under 35 U.S.C. 154(b) by 18 days.

(21) Appl. No.: 10/268,802

(22) Filed: Oct. 11, 2002

(65) Prior Publication Data

US 2003/0117718 A1 Jun. 26, 2003

(30) Foreign Application Priority Data

Oct. 12, 2001 (JP) .......................................... 2001-315557

(51) Int. Cl.⁷ .............................. G02B 13/18; G11B 7/00
(52) U.S. Cl. .................... 359/719; 359/642; 369/112.01
(58) Field of Search ................................. 359/642, 718, 359/719; 369/112.01

(56) References Cited

U.S. PATENT DOCUMENTS 5,726,436 A * 3/1998 Oka et al. ................. 250/201.5

FOREIGN PATENT DOCUMENTS

JP         2000182268          6/2000

* cited by examiner

*Primary Examiner*—Scott J. Sugarman
(74) *Attorney, Agent, or Firm*—Greenblum & Bernstein, P.L.C.

(57) ABSTRACT

A coma compensating element has two refraction surfaces. The refraction surfaces provide, as a whole, no aberration with respect to rays perpendicularly incident thereon, while the refraction surfaces provide coma with respect to rays obliquely incident thereon.

12 Claims, 13 Drawing Sheets

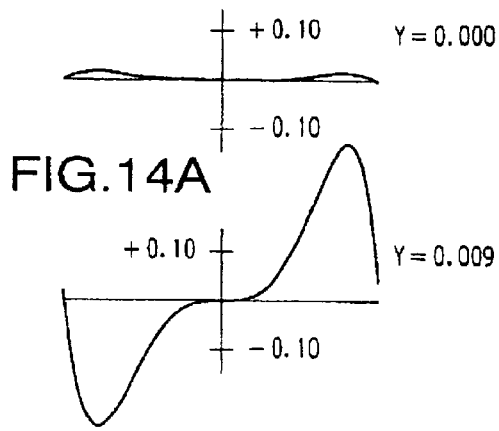
FIG.14A
FIG.14B
FIG.14C
FIG.14D
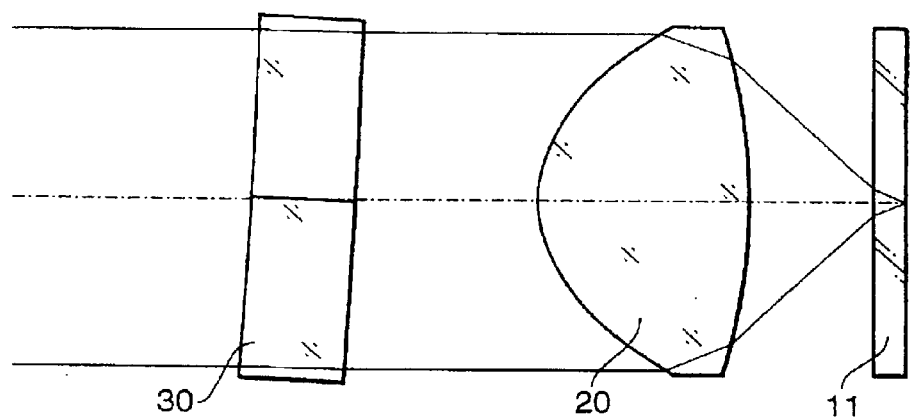
FIG.15
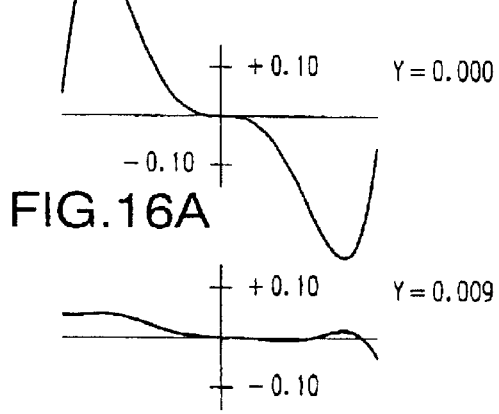
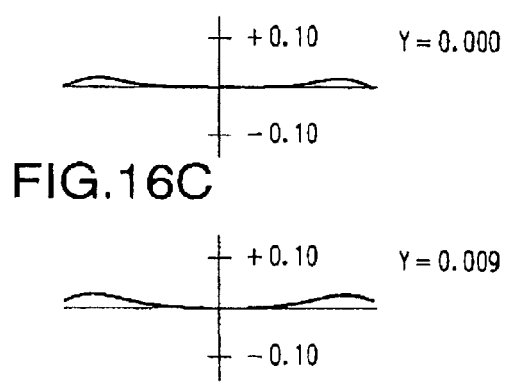
FIG.16A
FIG.16B
FIG.16C
FIG.16D

OPTICAL SYSTEM FOR OPTICAL PICKUP EMPLOYING COMA COMPENSATING ELEMENT

BACKGROUND OF THE INVENTION

The present invention relates to a coma compensating element for compensating coma of a high NA optical system employed in an optical pickup for an optical disc having a relatively high data recording density, and an optical system for such an optical disc employing the coma compensating element.

An optical system for an optical pickup is generally provided with a light source for emitting a laser beam, an objective lens for converging the light beam emitted by the light source onto an optical recording medium such as an optical disc, and a light receiving unit for receiving the light beam reflected by the data recording surface of the optical disc, and outputting signals. The objective lens is generally a single-element lens having aspherical surfaces. Alternatively, the object lens may consist of a plurality of lens elements each having spherical surfaces. The objective lens is generally designed so that spherical aberration and coma are well suppressed, and the laser beam is converged to form a diffraction-limited beam spot.

If the optical axes of both surfaces of the aspherical single-element lens are decentered (i.e., parallelly shifted from each other), or at least one lens element within a combination lens is decentered with respect to the optical axis of the remaining lens elements, even if the light beam incident on the objective lens coincides with the optical axis of the objective lens, coma is generated. In particular, for a disc drive using a disc having a relatively high data recording density, the objective lens should have a high NA (numerical aperture). Such a high NA objective lens is sensitive to the decentering of the surfaces. That is, with a slight decentering, significantly large coma is generated. Generally, the objective lens whose surfaces are aspherical is formed using metal molds. Specifically, two metal molds are used for both aspherical surfaces, respectively. Since a certain clearance is required between the two molds for manufacturing procedure, it is unavoidable that the two surfaces are decentered (i.e., shifted in a direction perpendicular to the optical axes thereof) with respect to each other, and the thus formed lens provides coma (i.e., decentering coma).

When an objective lens that provides the above-described decentering coma, or an objective lens whose abaxial coma is not completely compensated due to balance among various aberrations is used, it is necessary to align the direction of the beam incident on the objective lens and the optical axis of the objective lens precisely. Therefore, it is very difficult to adjust the arrangement of the optical elements of such an optical system. If the objective lens provides coma, and the adjustment (alignment) is insufficient, the laser beam cannot be sufficiently converged and a beam spot having the desired radius cannot be formed. In such a case, data may not be written/read correctly.

Further, in an optical pickup used for optical discs with cover layers having different thickness such as a DVD (digital versatile disc) and a CD (compact disc), and/or used for optical discs requiring different beam spot sizes, light beams having different wavelengths are used in order to realize different NA using the same objective lens. In such a case, the quantity of coma is different when the incident beam is inclined with respect to the optical axis of the objective lens. Therefore, it is impossible to design an objective lens which is capable of compensating coma for every disc.

SUMMARY OF THE INVENTION

The present invention is advantageous in that coma that is produced in a manufacturing process of the objective lens and/or due to inclination of the incident beam can be compensated for relatively easily. The present invention also provides an optical system for an optical pick-up to which the above-described compensation is applied.

According to an aspect of the invention, there is provided a coma compensating element having two refraction surfaces, the refraction surfaces providing no aberrations with respect to rays incident thereon perpendicularly, the refraction surfaces providing coma with respect to rays incident obliquely thereon, the coma provided by the two refraction surfaces being the same quantity in opposite directions.

By placing the coma compensating element within an optical system, and by inclining the central axis of the coma compensating element with respect to an optical axis of the optical system, coma of the entire optical system can be compensated.

According to embodiments, each of the refraction surfaces is a rotationally symmetrical aspherical surface. By employing the rotationally symmetrical aspherical surfaces, the coma can be compensated efficiently.

The two refraction surfaces should be configured to provide spherical aberration having substantially the same quantity but in the opposite directions. Therefore, the coma compensating element has a meniscus shape. The cross sectional shapes of the two surfaces may be identical. However, in such a case, due to the thickness of the coma compensating element, the spherical aberration provided thereby cannot be completely cancelled. Therefore, it is preferable that the cross sectional shapes of the two refraction surfaces are slightly different.

According to another aspect of the invention, there is provided an optical system for a optical pickup, which is provided with a light source that emits a light beam, an objective lens that converges the light beam emitted by the light source on a data recording surface of an optical disc, and at least one coma compensating element having two refraction surfaces. The coma compensating element may be configured as described above.

Optionally, a central axis of the at least one coma compensating element may be inclined with respect to an optical axis of the objective lens. In a particular case, an angle of a central axis of the at least one coma compensating element with respect to an optical axis of the objective lens is adjustable.

Depending on the image side NA of the optical system and/or the thickness of the protection layer of the optical disc to be used, the amount of coma may be different. Further, in order to compensate for the coma which is caused by the inclination of the optical disc as rotated, the inclination of the coma compensating element should be adjusted dynamically. For this purpose, it is preferable that the angle of the central axis of the coma compensating element with respect to the optical axis of the objective lens is adjustable.

It is preferable that the coma caused by the decentering of the refraction surfaces of the objective lens, and the coma due to the difference of the NA, thickness of the protection layer, inclination of the optical disc should be compensated by different coma compensating elements. Accordingly, the at least one coma compensating element may include first and second coma compensating elements.

Further preferably, an angle of a central axis of the first coma compensating element with respect to an optical axis of the objective lens may be fixed, while an angle of a central axis of the second compensating element with respect to the optical axis of the objective lens may be adjustable.

When the optical axis of the objective lens and the central axis of the coma compensating element are shifted with respect to each other, astigmatism is provided. Therefore, in order to retain the optical performance, it is preferable that the first coma compensating element moves integrally with the objective lens when the objective lens is moved for tracking.

However, in order to compensate for the coma due to the inclination of the optical disc as it is rotated, the coma compensating element should be dynamically inclined using an actuator. If the coma compensating element which moves integrally with the objective lens is also dynamically inclined by the actuator, the actuator should also be moved with the objective lens, which requires mechanical burden. It is rather preferable to have a configuration that the first coma compensating element is moved integrally with the objective lens when the objective lens is moved for tracking, while the second coma compensating element is not moved together with the objective lens when the objective lens is moved for tracking.

BRIEF DESCRIPTION OF THE ACCOMPANYING DRAWINGS

FIG. 1 schematically shows a structure of an optical system of an optical pickup according to a first embodiment of the invention;

FIGS. 14A through 14B are graphs showing wavefront aberration in the Y direction under a condition shown in FIG. 13;

FIGS. 14C and 14D are graphs showing wavefront aberration in the Z direction under the condition shown in FIG. 13;

FIG. 15 is a lens diagram showing a main portion of the optical system according to the third example, in which the coma compensating element is inclined;

FIGS. 16A and 16B are graphs showing wavefront aberration in the Y direction under a condition shown in FIG. 15;

FIGS. 16C and 16D are graphs showing wavefront aberration in the Z direction under the condition shown in FIG. 15;

Figure 25:
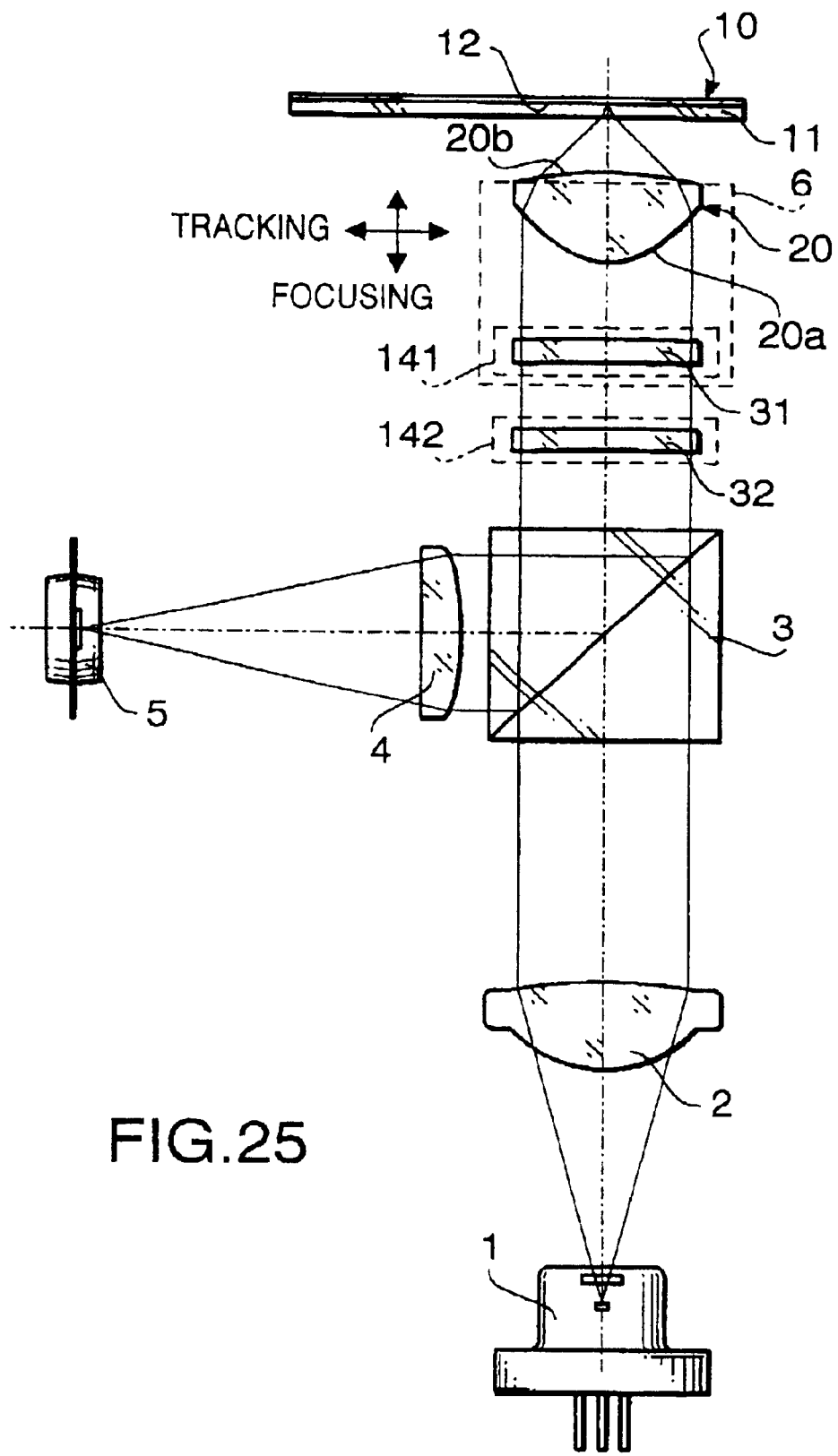
Figure 26:
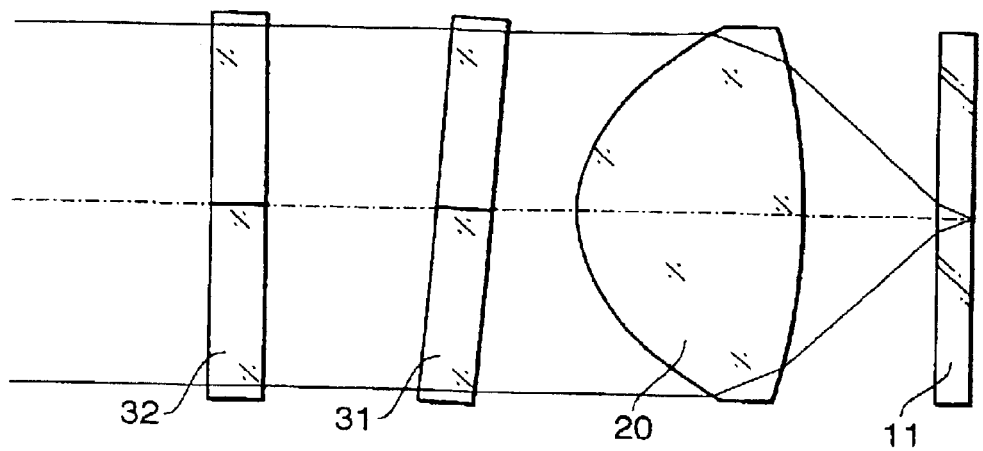
Figure 27A:
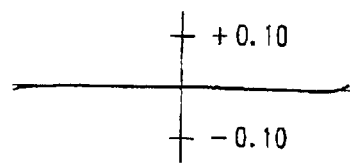
Figure 27B:
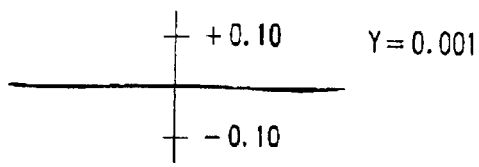
Figure 28A:
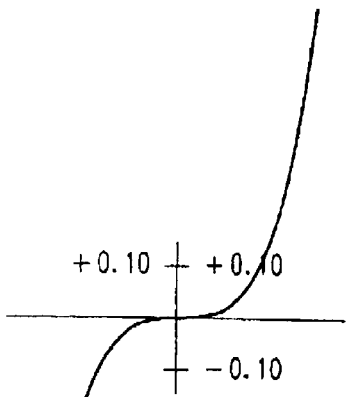
Figure 28B:
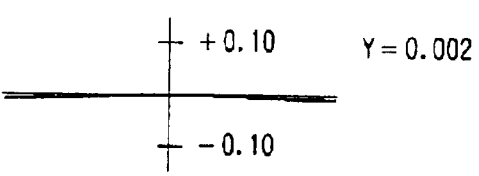
Figure 29:
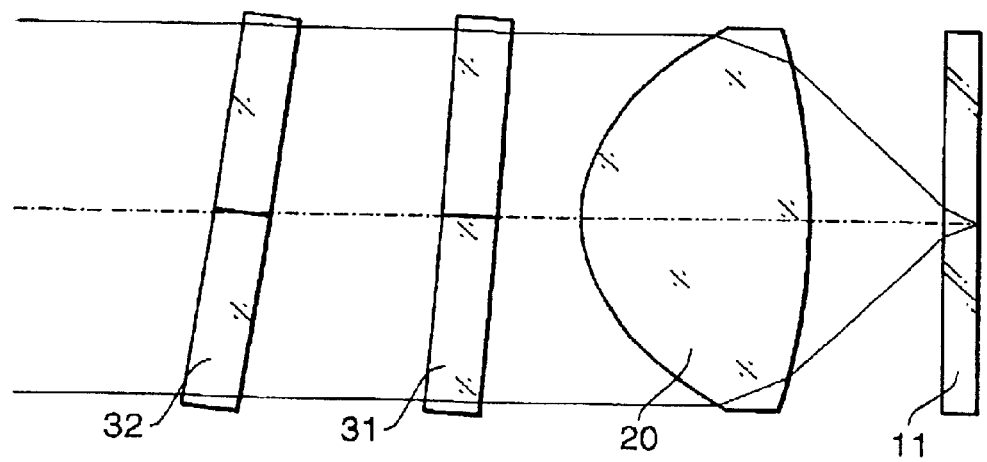
Figure 30A:
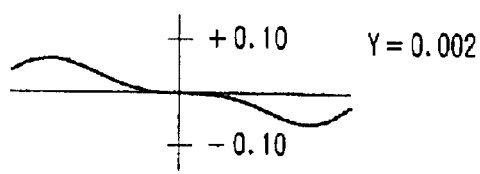
Figure 30B:
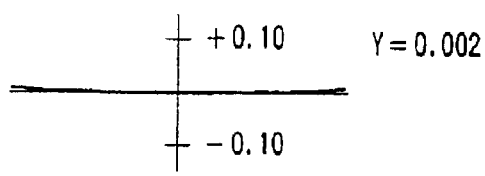

FIG. 25 schematically shows a structure of an optical system of an optical pickup according to a second embodiment of the invention;

FIG. 26 is a lens diagram showing a main portion of an optical system according to a sixth example, a first coma compensating element being inclined to compensate for coma due to decentering of lens surfaces;

FIGS. 27A and 27B are graphs showing wavefront aberration under a condition shown in FIG. 26;

FIGS. 28A and 28B are graphs showing wavefront aberration according to the sixth example when an optical disc is inclined and the aberration is not compensated;

FIG. 29 is a lens diagram showing the main portion of the optical system according to the sixth example, a second coma compensating element is inclined to compensate for wavefront aberration due to inclination of the optical disc; and FIGS. 30A and 30B are graphs showing wavefront aberration under a condition shown in FIG. 29.

DESCRIPTION OF THE EMBODIMENTS

Hereinafter, a coma compensating element and an optical pickup employing the coma compensating element will be described with reference to the accompanying drawings.

First Embodiment

Figure 1:
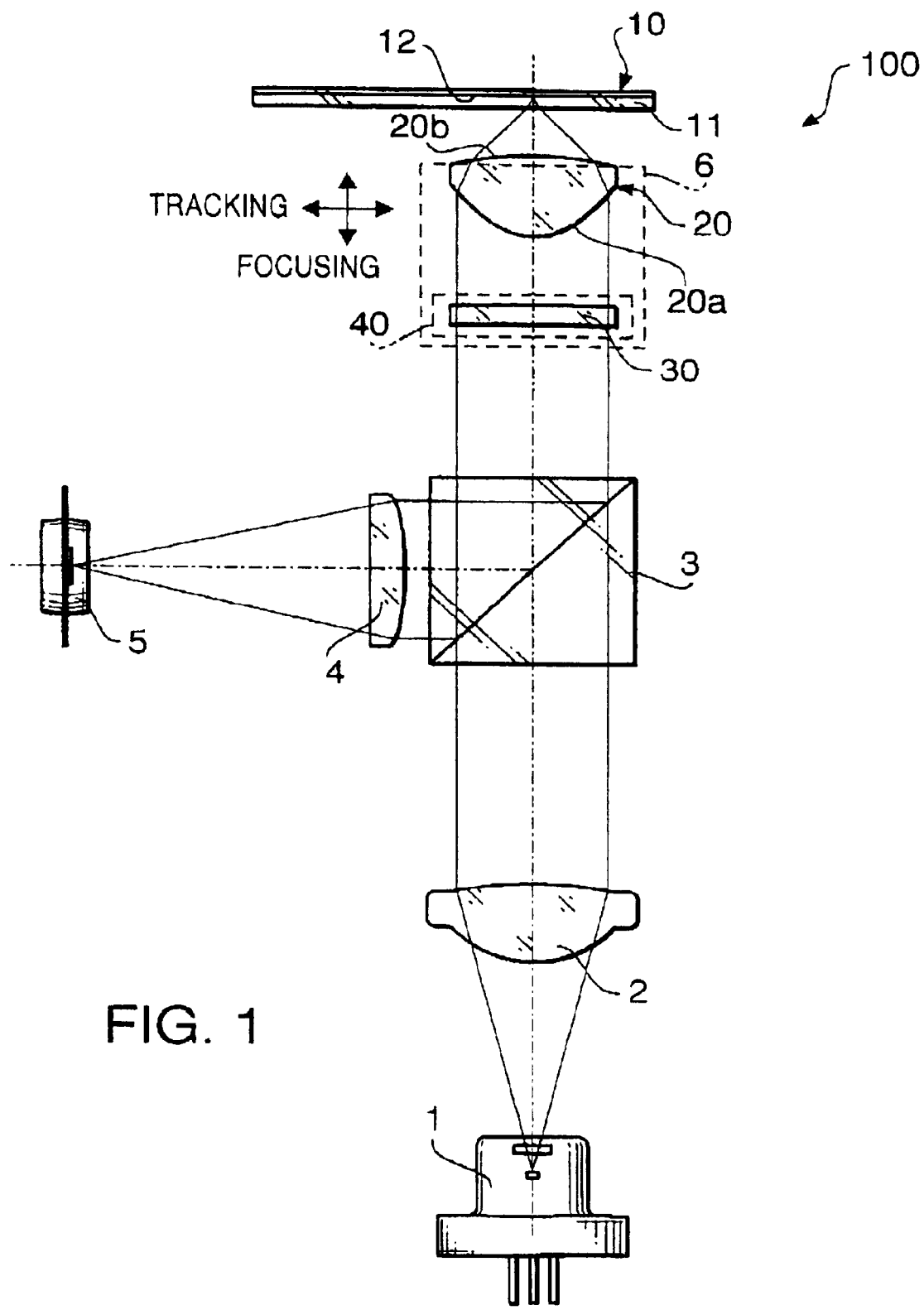

FIG. 1 schematically shows a configuration of an optical system of an optical pickup 100 employing the coma compensating element according to a first embodiment of the invention.

The optical pickup 100 includes a laser diode 1 emitting a divergent laser beam, a collimating lens 2 which collimates the laser beam emitted by the laser diode 1, an objective lens 20 that converges the laser beam on a data recording surface 12 of an optical disc 10 through a transparent protection layer 11, a beam splitter 3 that splits a beam reflected by the optical disc 10 from an optical path of the beam directed to the objective lens 20. The optical system further includes a condenser lens 4 that converges the beam split by the beam splitter 3 on a light receiving element 5, which outputs various signals based on the received beam.

The objective lens 20 is a single-element lens having a first surface 20a which is a light source side surface, and a second surface 20b which is an optical disc sides surface. Each of the first and second surfaces is an aspherical surface. The objective lens 20 is mounted an a lens actuator 6 which moves the objective lens 20 for tracking and focusing operations.

The lens actuator 6 further mounts a coma compensating element 30, which is moved integrally with the objective lens 20.

The coma compensating element 30 is inserted in an optical path between the beam splitter 3 and the objective lens 20. The coma compensating element 30 is a single element, both surfaces of which provide spherical aberrations in the opposite directions. Specifically, the coma compensating element 30 is configured such that its paraxial power is substantially zero, such that it does not provide aberration for rays incident perpendicularly thereon, and provides coma for rays obliquely incident thereon. The coma compensating element 30 has a meniscus shape, both surfaces of which are rotational aspherical surfaces, which provide spherical aberrations having the same quantity in opposite directions for the rays perpendicularly incident on its surfaces.

Figure 2:
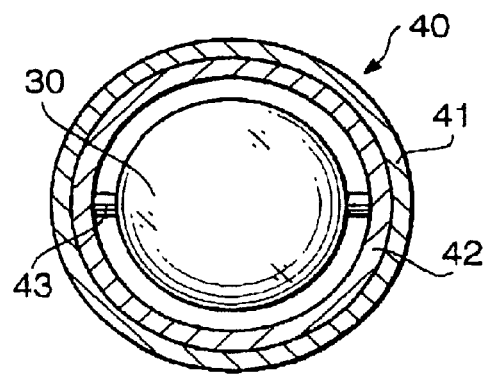
FIG. 2 is a plan view of an adjusting mechanism used for the optical pickup shown in FIG. 1.

The coma compensating element 30 is included in an adjusting mechanism 40 provided in the lens actuator 6. FIG. 2 shows an exemplary configuration of the adjusting mechanism 40. The adjusting mechanism 40 shown in FIG. 2 includes an outer frame 41 fixed on a casing (not shown) of the optical pickup 100, and an inner frame 42 which is slidably fitted in the outer frame 41. The coma compensating element 30 is secured to the inner frame 42 with a rotational shaft 43 provided across the inner frame 42 along the diameter thereof. With this configuration, by rotating the coma compensating element 30, with respect to the inner frame 42, about the rotational shaft 43, the quantity of the coma provided by the coma compensating element 30 is adjusted. Further, by rotating the inner frame 42 with respect to the outer frame 41, the direction of the coma provided by the coma compensating element 30 is adjusted.

For example, if coma is generated due to decentering or inclination of refraction surfaces of the objective lens 20, by adjusting the position of the coma compensating element 30, coma that cancels the coma generated by the objective lens 20 can be provided. Accordingly, coma can be canceled in the entire optical system.

It should be noted that the coma compensating element 30 can be provided outside the lens actuator 6. In such a case, however, when the objective lens 20 is moved for tracking but the coma compensating element 30 is not moved, astigmatism will be provided. For avoiding such astigmatism, it is preferable that the coma compensating element 30 is moved integrally with the objective lens 20.

If the optical pickup 100 is used for a plurality of optical discs having different thickness protection layers, and/or if the coma provided by the change of inclination of the optical disc 10 in association with its rotation is to be compensated, it becomes necessary to dynamically adjust a central angle of a central axis of the coma compensating element 30 with respect to the optical axis of the objective lens 20. In such a case, the adjusting mechanism 40 may be provided with another actuator which automatically detects the thickness of the optical disc and/or the inclination of the optical disc, and adjusts the inclination of the coma compensating element 30.

Five Concrete Examples according to First Embodiment

Hereinafter, five concrete examples according to the first embodiment will be presented.

First Example

Figure 3:
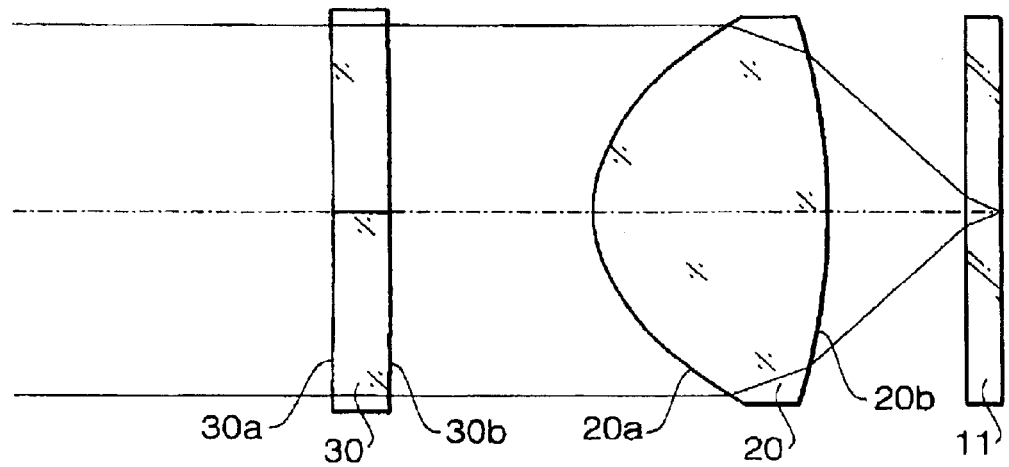
FIG. 3 is a lens diagram showing a main portion of the optical system according to a first example, when there is no decentering and inclination.

FIG. 3 is a lens diagram showing the coma compensating element 30, the objective lens 20, the protection layer 11 of the optical disc 10. In this example, there is no decentering or inclination of the surfaces of the objective lens 20, and the central axis of the coma compensating element 30 coincides with the optical axis of the objective lens 20.

In the first example, the objective lens 20 is a single-element lens, the thickness of the protection layer 11 is 0.3 mm, and the surfaces of the coma compensating element 30 have the same shape (one is concave and the other is convex).

The numerical configuration is shown in TABLE 1. In the TABLE, f denotes a focal length of the objective lens 20 (unit: mm), NA denotes the numerical aperture, r denotes a radius of curvature of a surface (unit: mm), d denotes a distance along the optical axis of adjoining surfaces (unit: mm), n denotes a refractive index for a working wavelength which is 405 nm. Surface numbers #1 and #2 represent the first surface 30a and the second surface 30b of the coma compensating element 30, surface numbers #3 and #4 represent the first surface 20a and the second surface 20b of the objective lens 20, and surface numbers #5 and #6 represent both surfaces of the protection layer 11 of the optical disc 10.

The surfaces of the coma compensating element 30 and the objective lens 20 are aspherical surfaces rotationally symmetrical about the optical axis.

It is know that an aspherical surface is expressed by a following formula:

$$X(h) = \frac{Ch^2}{1 + \sqrt{1-(1+K)C^2h^2}} + A_4h^4 + A_6h^6 + A_8h^8 + A_{10}h^{10} + A_{12}h^{12}$$

where, h represents a distance of a point on an aspherical surface with respect to the optical axis, X(h) represents a sag amount which is a distance, along the optical axis, of the point on the aspherical surface with respect to a plane tangential to the aspherical surface at the optical axis, C represents a curvature of the aspherical surface on the optical axis. K is a conical coefficient, and $A_4$, $A_6$, $A_8$, $A_{10}$ and $A_{12}$ are aspherical coefficients.

TABLE 2 shows the values of the coefficients defining the aspherical surface for the first example.

TABLE 1 f = 2.50 NA = 0.70

| SURFACE | r | d | n | description |
|---|---|---|---|---|
| #1 | inf. | 0.50 | 1.5066 | coma compensating element |
| #2 | inf. | 1.75 | | |
| #3 | 1.489 | 2.00 | 1.5066 | objective lens |
| #4 | −4.645 | 1.19 | | |
| #5 | inf. | 0.30 | 1.6223 | protection layer |
| #6 | inf. | — | | |

TABLE 2

| | SURFACE #1 | SURFACE #2 | SURFACE #3 | SURFACE #4 |
|---|---|---|---|---|
| K | 0.00 | 0.00 | −0.65 | 0.00 |
| $A_4$ | $-1.00 \times 10^{-3}$ | $-1.00 \times 10^{-3}$ | $1.46 \times 10^{-3}$ | $2.09 \times 10^{-2}$ |
| $A_6$ | $0.00 \times 10^{+0}$ | $0.00 \times 10^{+0}$ | $-5.38 \times 10^{-4}$ | $-4.89 \times 10^{-3}$ |
| $A_8$ | $0.00 \times 10^{+0}$ | $0.00 \times 10^{+0}$ | $-2.00 \times 10^{-4}$ | $9.68 \times 10^{-4}$ |
| $A_{10}$ | $0.00 \times 10^{+0}$ | $0.00 \times 10^{+0}$ | $-3.36 \times 10^{-5}$ | $-1.28 \times 10^{-4}$ |
| $A_{12}$ | $0.00 \times 10^{+0}$ | $0.00 \times 10^{+0}$ | $-5.50 \times 10^{-6}$ | $8.13 \times 10^{-6}$ |

Figure 4A:
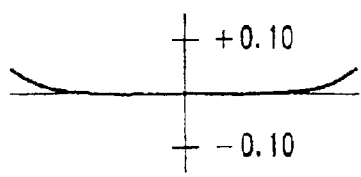
FIGS. 4A and 4B are graphs showing wavefront aberration under a condition shown in FIG. 3.
Figure 4B:
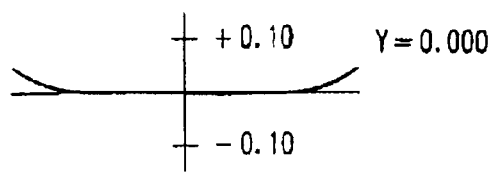

FIGS. 4A and 4B show wavefront aberration under a condition shown in FIG. 3. FIG. 4A shows a wavefront in the Y direction, on a plane of FIG. 3 and perpendicular to the optical axis, and FIG. 4B shows a wavefront in the Z direction, perpendicular to the plane of FIG. 3 and perpendicular to the optical axis.

The vertical axis represent the quantity of the aberration (unit: λ), and the horizontal axis represents the distance from the optical axis.

As known from FIGS. 4A and 4B, since the both surfaces of the coma compensation element 30 have the same shape and the coma compensation element 30 has a certain thickness, the spherical aberration provided by both surfaces cannot be completely cancelled, and certain amount of residual spherical aberration is provided.

Figure 5A:
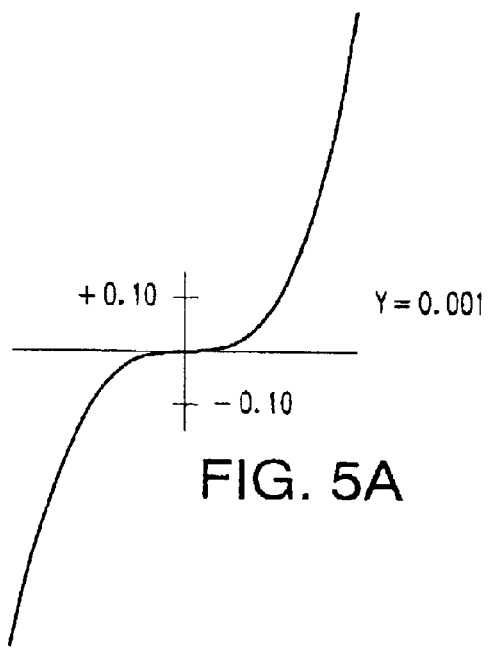
FIGS. 5A and 5B are graphs showing wavefront aberration, which is not compensated for, of the optical system according to the first example when the lens surfaces are decentered.
Figure 5B:
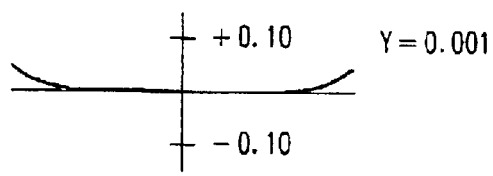
Figure 6:
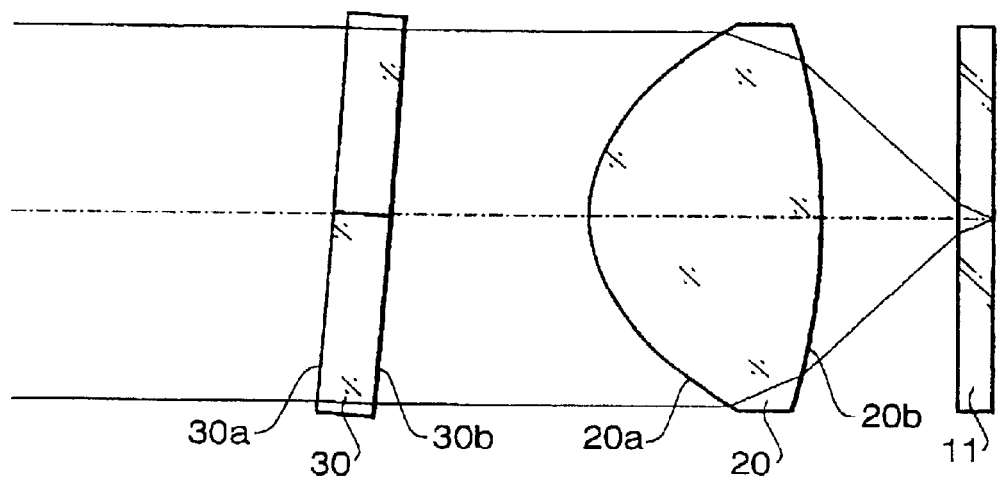
FIG. 6 is a lens diagram showing the main portion of the optical system according to the first example, in which a coma compensating element is provided to compensate for coma due to decentering of the lens surfaces.
Figure 7A:
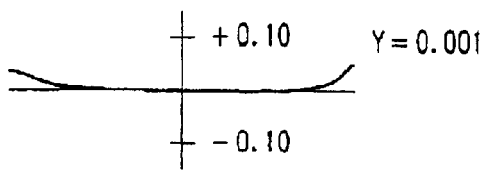
FIGS. 7A and 7B are graphs showing wavefront aberration under a condition shown in FIG. 6.
Figure 7B:
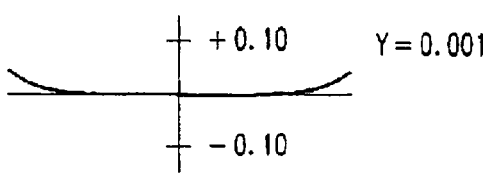

If the second surface 20b of the objective lens 20 is decentered with respect to the first surface 20a by 10 μm in the direction perpendicular to the optical axis, the wavefront aberration increased as shown in FIGS. 5A and 5B due to the coma which is provided due to the decentering of the second surface 20b. If the coma compensating element 30 is inclined by −3.75° as shown in FIG. 6, the coma due to the decentering of the second surface 20b is cancelled by coma which is provided due to the inclination of the coma compensating element 30. FIGS. 7A and 7B show graphs of the wavefront aberration under the condition shown in FIG. 6. As understood by comparing FIGS. 7A and 7B with FIGS. 4A and 4B, the wavefront aberration is compensated as well as the condition where the surfaces of the objective lens are not decentered as shown in FIGS. 4A and 4B.

Second Example

Figure 8:
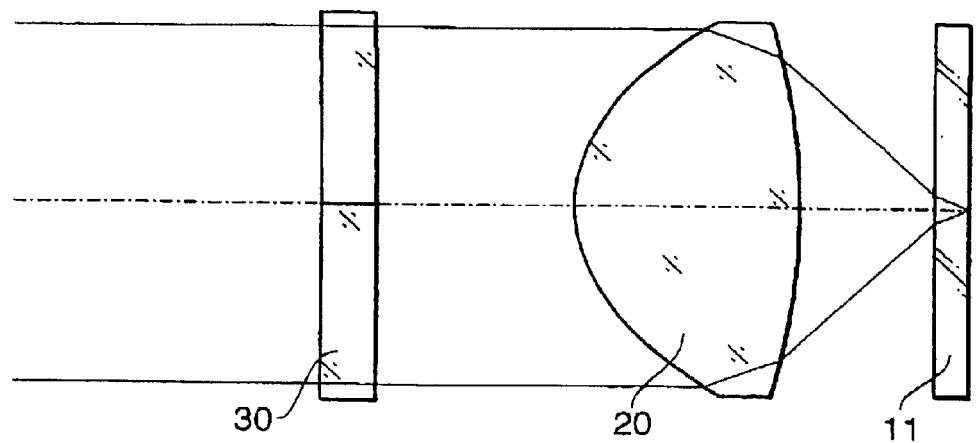
FIG. 8 is a lens diagram showing a main portion of the optical system according to a second example, when there is no decentering and inclination.

FIG. 8 shows a lens diagram showing the coma compensating element 30, the objective lens 20, and the protection layer 11 of the optical disc 10, according to the second example.

There is no decentering or inclination in the surfaces of the objective lens 20, and the central axis of the coma compensating element 30 coincides with the optical axis of the objective lens 20.

The objective lens 20 is a single-element lens, the thickness of the protection layer is 0.3 mm, and the both surfaces of the coma compensation element 30 have different shapes. As aforementioned, if both surfaces of the coma compensating element 30 have the same shape, before the compensation is applied, the spherical aberration provided by one surface of the coma compensation element 30 cannot be cancelled completely by the spherical aberration provided by the other surface of the coma compensation element 30. In the second example, the both surfaces are differentiated so that the spherical aberration provided by one surface of the coma compensation element 30 is completely cancelled by the spherical aberration provided by the other surface.

TABLE 3 shows numerical configuration of the optical system according to the second embodiment and TABLE 4 shows values of coefficients defining aspherical surfaces.

TABLE 3 f = 2.50 NA = 0.70

| SURFACE | r | d | n | description |
|---|---|---|---|---|
| #1 | inf. | 0.50 | 1.5066 | coma compensating element |
| #2 | inf. | 1.75 | | |
| #3 | 1.489 | 2.00 | 1.5066 | objective lens |
| #4 | −4.645 | 1.19 | | |
| #5 | inf. | 0.30 | 1.6223 | protection layer |
| #6 | inf. | — | | |

TABLE 4

| | SURFACE #1 | SURFACE #2 | SURFACE #3 | SURFACE #4 |
|---|---|---|---|---|
| K | 0.00 | 0.00 | −0.65 | 0.00 |
| $A_4$ | $-1.00 \times 10^{-3}$ | $-9.99 \times 10^{-4}$ | $1.46 \times 10^{-3}$ | $2.09 \times 10^{-2}$ |
| $A_6$ | $0.00 \times 10^{+0}$ | $9.70 \times 10^{-7}$ | $-5.38 \times 10^{-4}$ | $-4.89 \times 10^{-3}$ |
| $A_8$ | $0.00 \times 10^{+0}$ | $0.00 \times 10^{+0}$ | $-2.00 \times 10^{-4}$ | $9.68 \times 10^{-4}$ |
| $A_{10}$ | $0.00 \times 10^{+0}$ | $0.00 \times 10^{+0}$ | $-3.36 \times 10^{-5}$ | $-1.28 \times 10^{-4}$ |
| $A_{12}$ | $0.00 \times 10^{+0}$ | $0.00 \times 10^{+0}$ | $-5.50 \times 10^{-6}$ | $8.13 \times 10^{-6}$ |

Figure 9A:
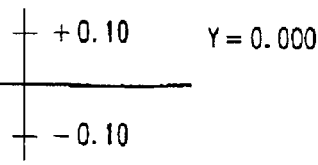
FIGS. 9A and 9B are graphs showing wavefront aberration under a condition shown in FIG. 8.
Figure 9B:
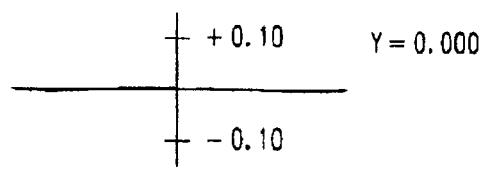

FIGS. 9A and 9B show wavefront aberration under a condition shown in FIG. 8. As known from FIGS. 9A and 9B, by differentiating both surfaces of the coma compensation element 30, the spherical aberration provided by both surfaces can be completely cancelled with each other. Thus, no wavefront aberration is provided.

Figure 10A:
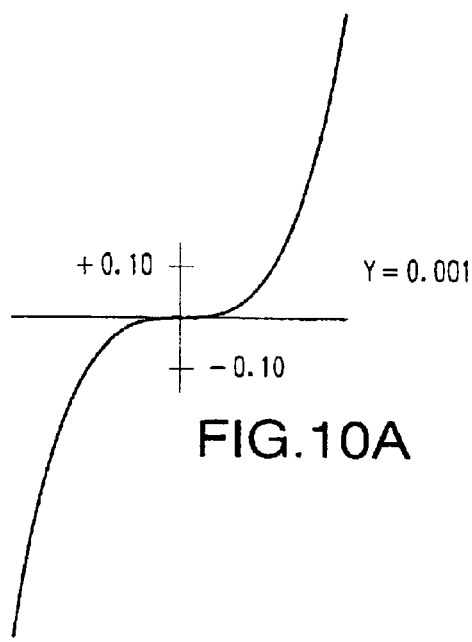
FIGS. 10A and 10B are graphs showing wavefront aberration, which is not compensated for, of the optical system according to the second example when the lens surfaces are decentered.
Figure 10B:
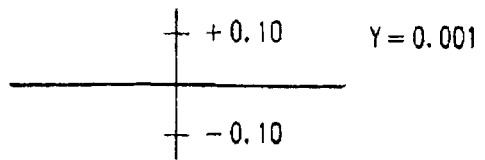
Figure 11:
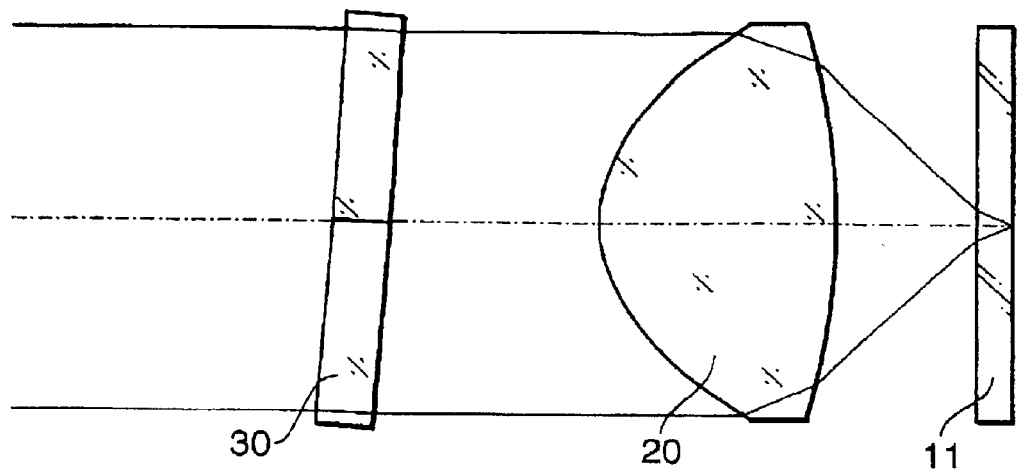
FIG. 11 is a lens diagram showing the main portion of the optical system according to the second example, in which a coma compensating element is provided to compensate for coma due to decentering of the lens surfaces.
Figure 12A:
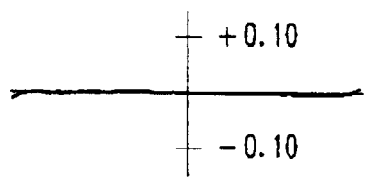
FIGS. 12A and 12B are graphs showing wavefront aberration under a condition shown in FIG. 11.
Figure 12B:
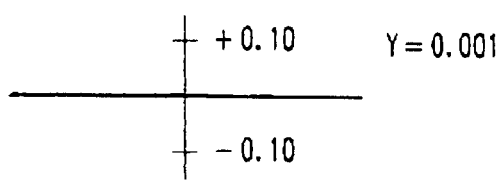

If the second surface 20b of the objective lens 20 is decentered with respect to the first surface 20a by 10 μm in the direction perpendicular to the optical axis, the wavefront aberration increased as shown in FIGS. 10A and 10B due to the coma which is provided due to the decentering of the second surface 20b. If the coma compensating element 30 is inclined by −3.75° as shown in FIG. 11, the coma due to the decentering of the second surface 20b is cancelled by coma which is provided due to the inclination of the coma compensating element 30. FIGS. 12A and 12B show graphs of the wavefront aberration under the condition shown in FIG. 11. As understood by comparing FIGS. 12A and 12B with FIGS. 9A and 9B, the wavefront aberration is compensated as well as the condition where the surfaces of the objective lens are not decentered as shown in FIGS. 9A and 9B.

Third Example

Figure 13:
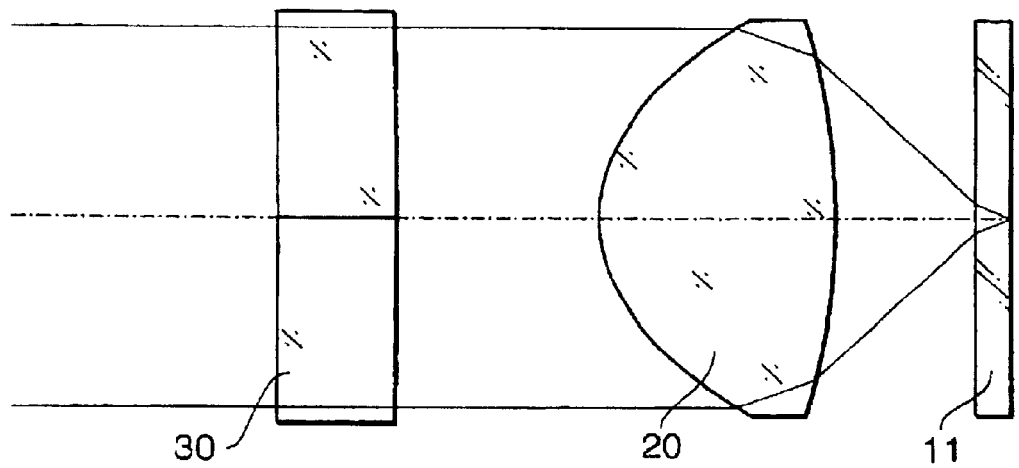
FIG. 13 is a lens diagram showing a main portion of the optical system according to a third example, in which the coma compensating element is not inclined.

FIG. 13 shows a lens diagram showing the coma compensating element 30, the objective lens 20, and the protection layer 11 of the optical disc 10, according to the third example.

There is no decentering or inclination in the surfaces of the objective lens 20, and the central axis of the coma compensating element 30 coincides with the optical axis of the objective lens 20.

The objective lens 20 is a single-element lens, the thickness of the protection layer is 0.3 mm, and both surfaces of the coma compensation element 30 have the same shape.

TABLE 5 shows numerical configuration of the optical system according to the third example and TABLE 6 shows values of coefficients defining aspherical surfaces.

TABLE 5 f = 2.50 NA = 0.70

| SURFACE | r | d | n | description |
|---|---|---|---|---|
| #1 | inf. | 0.50 | 1.5297 | coma compensating element |
| #2 | inf. | 1.75 | | |
| #3 | 1.489 | 2.00 | 1.5066 | objective lens |
| #4 | −4.645 | 1.19 | | |
| #5 | inf. | 0.30 | 1.6223 | protection layer |
| #6 | inf. | — | | |

TABLE 6

| | SURFACE #1 | SURFACE #2 | SURFACE #3 | SURFACE #4 |
|---|---|---|---|---|
| K | 0.00 | 0.00 | −0.65 | 0.00 |
| $A_4$ | −2.00 × 10$^{-3}$ | −2.00 × 10$^{-3}$ | 1.46 × 10$^{-3}$ | 2.09 × 10$^{-2}$ |
| $A_6$ | 4.20 × 10$^{-4}$ | 4.20 × 10$^{-4}$ | −5.38 × 10$^{-4}$ | −4.89 × 10$^{-3}$ |
| $A_8$ | 0.00 × 10$^{+0}$ | 0.00 × 10$^{+0}$ | −2.00 × 10$^{-4}$ | 9.68 × 10$^{-4}$ |
| $A_{10}$ | 0.00 × 10$^{+0}$ | 0.00 × 10$^{+0}$ | −3.36 × 10$^{-5}$ | −1.28 × 10$^{-4}$ |
| $A_{12}$ | 0.00 × 10$^{+0}$ | 0.00 × 10$^{+0}$ | −5.50 × 10$^{-6}$ | 8.13 × 10$^{-6}$ |

In the third example, the objective lens 20 is configured to provide a high-order coma even though there is no decentering or inclination of the surfaces thereof. FIGS. 14A and 14B are graphs showing wavefront aberration under a condition shown in FIG. 13 in the Y direction, on a plane of FIG. 13 and perpendicular to the optical axis. FIGS. 14C and 14D are graphs showing wavefront aberration under the condition shown in FIG. 13 in the Z direction, perpendicular to the plane of FIG. 13 and perpendicular to the optical axis. As shown in FIGS. 14A through 14D, the wavefront aberration is deteriorated outside the paraxial range ($\omega \geq 0.2°$). In such a case, if there is certain error in assembling the objective lens 20, it becomes impossible to converge the beam sufficiently to form a beam spot having a desired diameter due to the wavefront aberration.

Such abaxial coma can be compensated by inclining the coma compensating element 30. FIG. 15 shows a condition where the coma compensating element 30 is inclined by −2.4°. FIGS. 16A and 16B are graphs showing wavefront aberration in the Y direction under the condition shown in FIG. 15, and FIGS. 16C and 16D are graphs showing wavefront aberration in the Z direction under the condition shown in FIG. 15. By comparing FIGS. 14A through 14D with FIGS. 16A through 16D, it is understood that the abaxial coma can be compensated by inclining the coma compensating element 30. As shown in FIG. 16A, the paraxial coma increases. However, in this example, there is an error in assembling the objective lens 20 and the abaxial light is used, the performance for the paraxial light is not important. It should be stressed that, it is very difficult to eliminate the assembling error by adjusting the objective lens itself, but, with use of the coma compensating element, due to its low sensitivity with respect its orientation, the adjustment can be done easily.

Fourth Example

Figure 17:
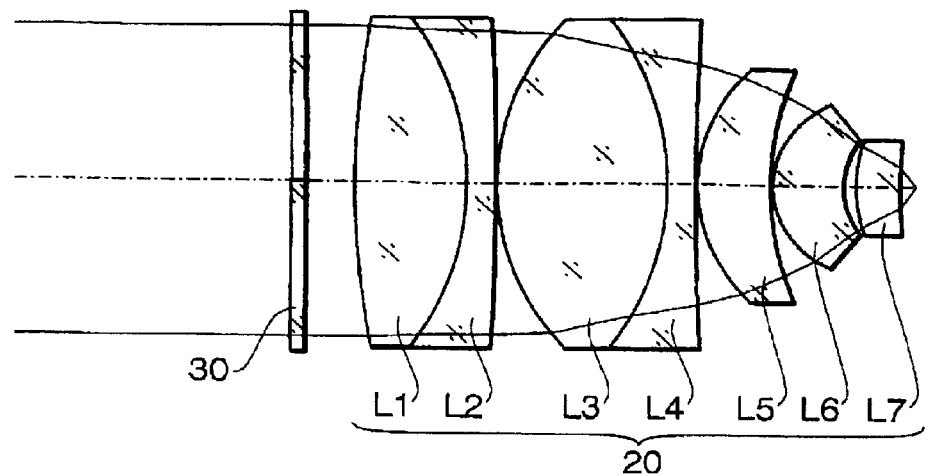
FIG. 17 is a lens diagram showing a main portion of the optical system according to the fourth example, in which the coma compensating element is not inclined.

FIG. 17 shows a lens diagram showing the coma compensating element 30 and the objective lens 20 according to the fourth example.

There is no decentering or inclination in the surfaces of the objective lens 20, and the central axis of the coma compensating element 30 coincides with the optical axis of the objective lens 20.

The objective lens 20 includes seven lenses L1 through L7, the optical disc does not have a protection layer, and both surfaces of the coma compensation element 30 have the same shape.

TABLE 7 shows numerical configuration of the optical system according to the fourth example and TABLE 8 shows values of coefficients defining aspherical surfaces.

TABLE 7 f = 8.00 NA = 0.75

| SURFACE | r | d | n | description |
|---|---|---|---|---|
| #1 | inf. | 0.50 | 1.5066 | coma compensating element |
| #2 | inf. | 1.75 | | |
| #3 | 33.400 | 4.00 | 1.4464 | L1 |
| #4 | −10.700 | 1.00 | 1.5343 | L2 |
| #5 | −120.000 | 0.10 | | |
| #6 | 9.490 | 6.00 | 1.4464 | L3 |
| #7 | −10.700 | 1.00 | 1.5343 | L4 |
| #8 | 120.000 | 0.10 | | |
| #9 | 6.370 | 2.50 | 1.5072 | L5 |
| #10 | 11.680 | 0.10 | | |
| #11 | 3.430 | 2.50 | 1.5072 | L6 |
| #12 | 2.940 | 0.47 | | |
| #13 | 6.590 | 1.50 | 1.6053 | L7 |
| #14 | 11.570 | 0.70 | | |

TABLE 8

| | SURFACE #1 | SURFACE #2 |
|---|---|---|
| K | 0.00 | 0.00 |
| $A_4$ | −1.00 × 10$^{-5}$ | −1.00 × 10$^{-5}$ |
| $A_6$ | 0.00 × 10$^{+0}$ | 0.00 × 10$^{+0}$ |
| $A_8$ | 0.00 × 10$^{+0}$ | 0.00 × 10$^{+0}$ |
| $A_{10}$ | 0.00 × 10$^{+0}$ | 0.00 × 10$^{+0}$ |
| $A_{12}$ | 0.00 × 10$^{+0}$ | 0.00 × 10$^{+0}$ |

Figure 18A:
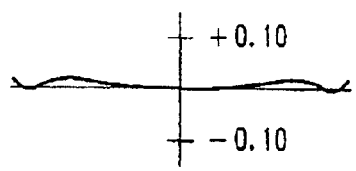
FIGS. 18A and 18B are graphs showing wavefront aberration under a condition shown in FIG. 17.
Figure 18B:
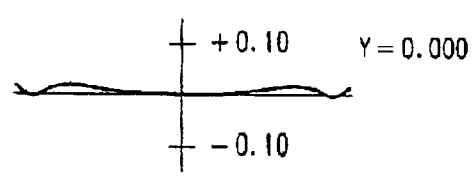

FIGS. 18A and 18B show wavefront aberration under a condition shown in FIG. 17. As known from FIGS. 18A and 18B, since the surface of the coma compensation element 30 have the same shape, it is impossible to completely cancel the spherical aberration provided by both surfaces with each other, and therefore, wavefront aberration is provided slightly.

Figure 19A:
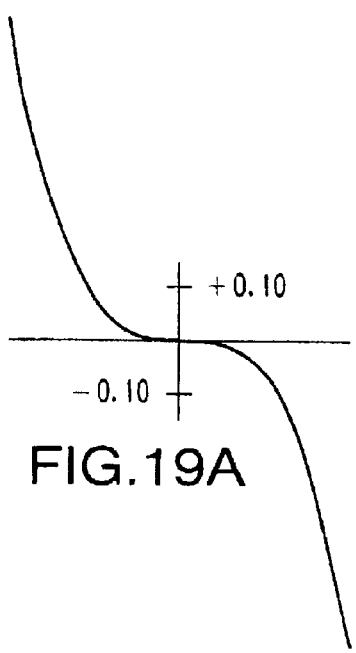
FIGS. 19A and 19B are graphs showing wavefront aberration, which is not compensated for, of the optical system according to a fourth example when the lens surfaces are decentered.
Figure 19B:
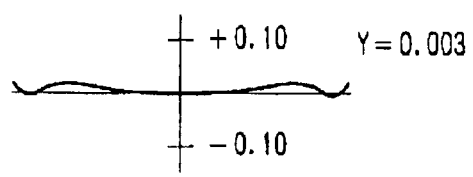
Figure 20:
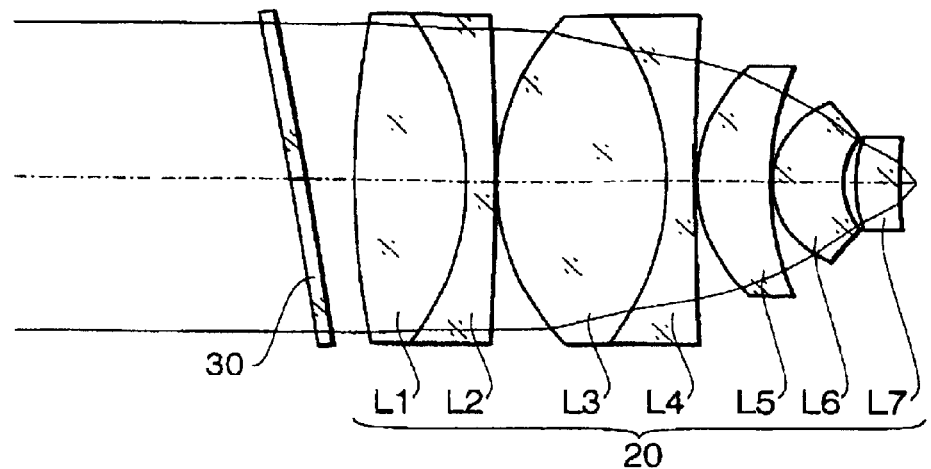
FIG. 20 is a lens diagram showing a main portion of the optical system according to the fourth example, in which the coma compensating element is inclined.
Figure 21A:
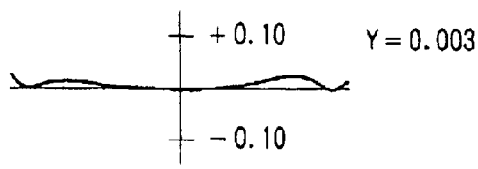
FIGS. 21A and 21B are graphs showing wavefront aberration under a condition shown in FIG. 20.
Figure 21B:
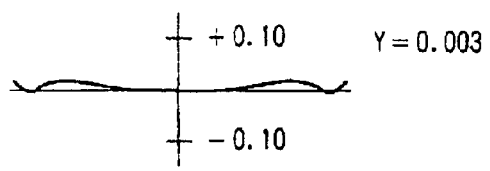

If the sixth lens L6 of the objective lens 20 is decentered (i.e., shifted in a direction perpendicular to the optical axis) with respect to the other lenses by 10 μm in the direction perpendicular to the optical axis, the wavefront aberration is increased as shown in FIGS. 19A and 19B due to the coma which is provided due to the decentering of the sixth lens L6. If the coma compensating element 30 is inclined by −8.9° as shown in FIG. 20, the coma due to the decentering of the sixth lens L6 is cancelled by coma which is provided due to the inclination of the coma compensating element 30. FIGS. 21A and 21B show graphs of the wavefront aberration under the condition shown in FIG. 20. As understood by comparing FIGS. 21A and 21B with FIGS. 19A and 19B, the wavefront aberration is compensated as well as the condition where the surfaces of the objective lens are not decentered as shown in FIGS. 18A and 18B.

Fifth Example

Figure 22:
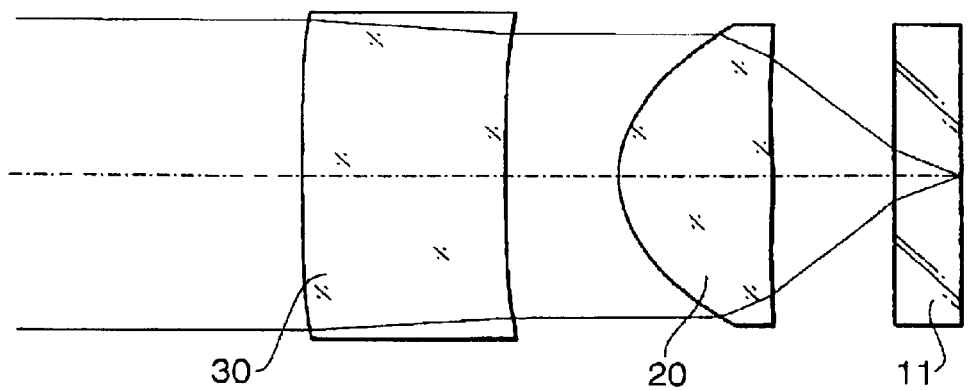
FIG. 22 is a lens diagram showing a main portion of the optical system according to a fifth example, in which the coma compensating element is not inclined.
Figure 23A:
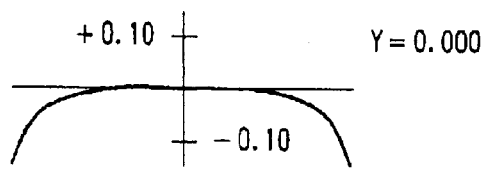
FIGS. 23A through 23H are graphs showing wavefront aberration without a coma compensating element.
Figure 23B:
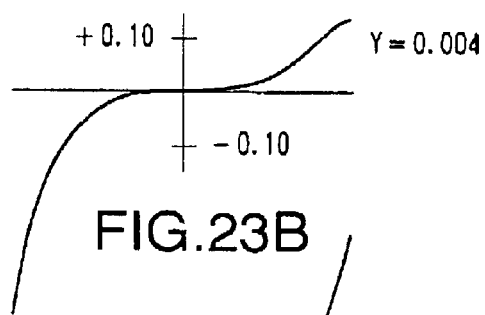
Figure 23C:
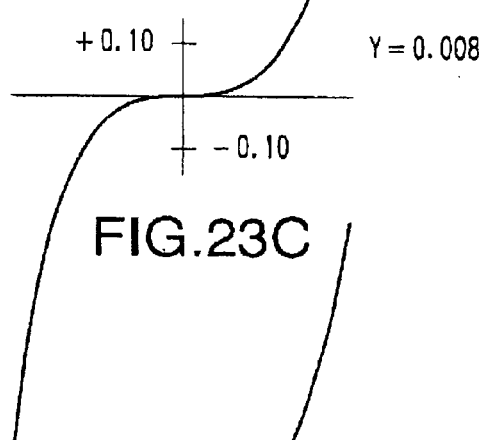
Figure 23D:
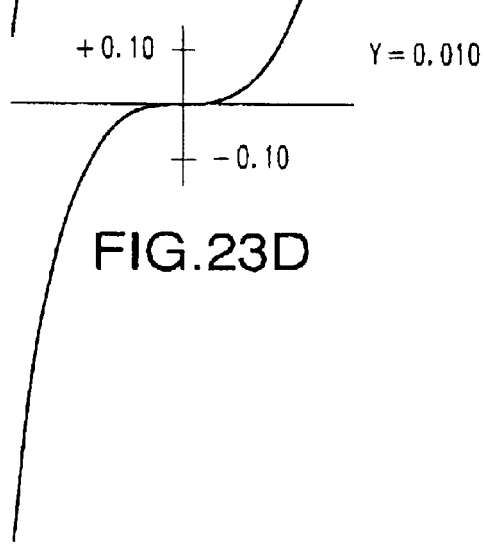
Figure 23E:
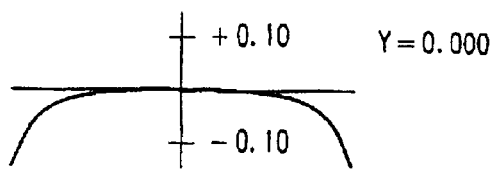
Figure 23F:
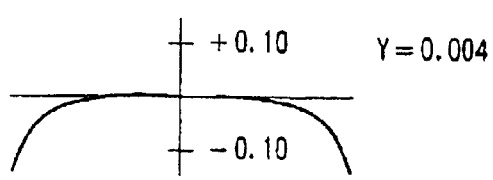
Figure 23G:
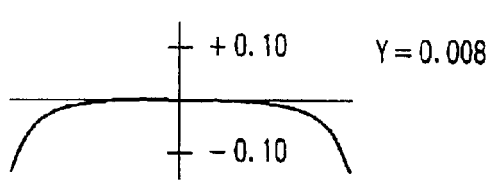
Figure 23H:
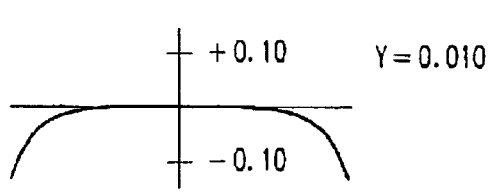
Figure 24A:
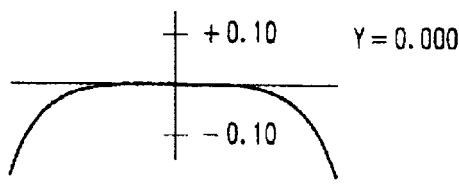
FIGS. 24A through 24H are graphs showing wavefront aberration under a condition shown in FIG. 22.
Figure 24E:
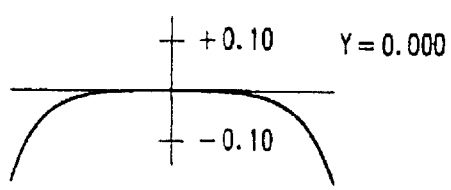
Figure 24B:
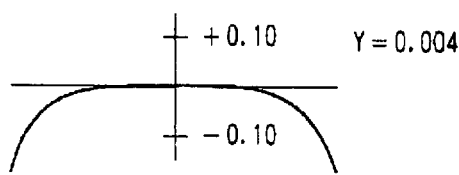
Figure 24F:
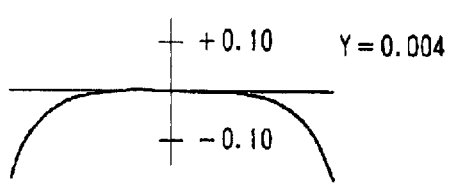
Figure 24C:
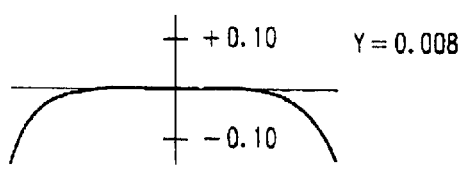
Figure 24G:
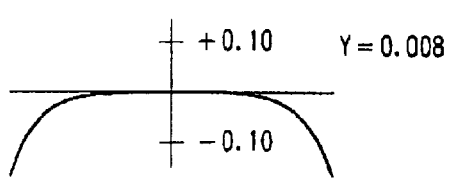
Figure 24D:
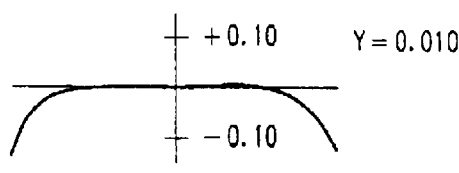
Figure 24H:
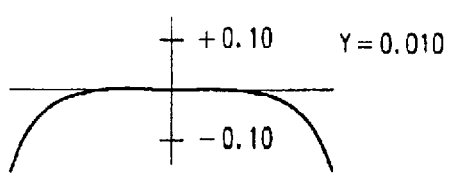

FIG. 22 shows a lens diagram showing the coma compensating element 30, the objective lens 20, and the protection layer 11 of the optical disc 10, according to the third example.

There is no decentering or inclination in the surfaces of the objective lens 20, and the central axis of the coma compensating element 30 coincides with the optical axis of the objective lens 20.

The objective lens 20 is a single-element lens, the thickness of the protection layer is 0.6 mm, and both surfaces of the coma compensation element 30 have the same shape.

TABLE 9 shows numerical configuration of the optical system according to the fifth example and TABLE 10 shows values of coefficients defining aspherical surfaces.

TABLE 9 f = 2.34 NA = 0.60

| SURFACE | r | d | n | description |
|---|---|---|---|---|
| #1 | inf. | 1.80 | 1.5406 | coma compensating element |
| #2 | inf. | 1.00 | | |
| #3 | 1.304 | 1.36 | 1.5406 | objective lens |
| #4 | −26.606 | 1.09 | | |
| #5 | inf. | 0.60 | 1.5406 | protection layer |
| #6 | inf. | — | | |

TABLE 10

| | SURFACE #1 | SURFACE #2 | SURFACE #3 | SURFACE #4 |
|---|---|---|---|---|
| K | 0.00 | 0.00 | −0.77 | 0.00 |
| $A_4$ | $1.20 \times 10^{-2}$ | $1.20 \times 10^{-2}$ | $1.72 \times 10^{-2}$ | $2.04 \times 10^{-2}$ |
| $A_6$ | $0.00 \times 10^{+0}$ | $7.39 \times 10^{-4}$ | $3.55 \times 10^{-3}$ | $-3.15 \times 10^{-3}$ |
| $A_8$ | $0.00 \times 10^{+0}$ | $6.10 \times 10^{-5}$ | $1.63 \times 10^{-3}$ | $0.00 \times 10^{+0}$ |
| $A_{10}$ | $0.00 \times 10^{+0}$ | $9.95 \times 10^{-6}$ | $-3.46 \times 10^{-4}$ | $0.00 \times 10^{+0}$ |
| $A_{12}$ | $0.00 \times 10^{+0}$ | $0.00 \times 10^{+0}$ | $2.42 \times 10^{-4}$ | $0.00 \times 10^{+0}$ |

In the fifth example, the objective lens 20 is configured as a lens which does not satisfy the sine condition. FIGS. 23A through 23D are graphs showing wavefront aberration in the Y direction, without the comma compensating element 30, and FIGS. 23E through 23H show wavefront aberration in the Z direction. As shown in FIGS. 23A through 23H, the objective lens 20 provides coma outside the paraxial area, thereby the wavefront aberration is significantly deteriorated. By inserting the coma compensating element 30, the sine condition is well compensated as the objective lens as a whole. FIGS. 24A through 24D are graphs showing wavefront aberration in the Y direction under the condition shown in FIG. 22 (i.e., with the coma compensating element 30 inclined), and FIGS. 24E through 24H show wavefront aberration in the Z direction under the condition shown in FIG. 22. As shown in FIGS. 24A through 24H which show coma of the objective lens 20, the coma is well compensated for, and the deterioration of the wavefront aberration is reduced.

Second Embodiment

FIG. 25 schematically shows a configuration of the optical system according to the second embodiment.

As described above, causes of the coma includes a decentering of optical elements such as the objective lens, inclination thereof, variation of the thickness of the protection layer, inclination of the disc in association with the rotation thereof, and the like. In the optical head according to the second embodiment, in order to compensate for the coma due to arrangement of the optical elements, a first coma compensating element 31 is provided in the lens actuator 6 as in the first embodiment. Further, in order to compensate for the coma due to the change of the optical disc, a second coma compensating element is provided outside the actuator 6.

The first coma compensating element 31 is provided in the first adjusting mechanism 141. The angle of the first coma compensating element 31 is adjusted to compensate for the coma generated by the optical system. It should be noted that the angle is not changed after it has been changed once. On the other hand, the second coma compensating element 32 is included in the second adjusting mechanism 142 which also includes an actuator for changing the angle of the second coma compensating element 32. The second adjusting mechanism 142 detects the change of the thickness of the protection layer, inclination of the optical disc and the like, and dynamically changes the angle of the second coma compensating element 32.

Concrete Example (Sixth Example)

FIG. 26 is a lens diagram showing the first coma compensating element 31, the second coma compensating element 32, the objective lens 20, and the protection layer 11 of the optical disc 10 according to the sixth example.

In sixth example, the objective lens has a surface which is decentered by 10 μm, and the first coma compensating element 31 is inclined to compensate for the spherical aberration due to the decentering of the objective lens 20. In the sixth example, the objective lens 20 is a single-element lens, the thickness of the protection layer 11 is 0.3 mm, and each of the first and second coma compensation elements is an optical element whose surfaces have different shapes. It should be noted that the first and second coma compensation elements 31 and 32 have the same shape.

TABLE 11 shows numerical configuration of the optical system according to the sixth example and TABLE 12 shows values of coefficients defining aspherical surfaces.

TABLE 11 f = 2.50 NA = 0.70

| SURFACE | r | d | n | description |
|---|---|---|---|---|
| #1 | inf. | 0.50 | 1.5066 | 2nd coma compensating element |
| #2 | inf. | 1.50 | | |
| #3 | inf. | 0.50 | 1.5066 | 1st coma compensating element |
| #4 | inf. | 1.75 | | |
| #5 | 1.489 | 2.00 | 1.5066 | objective lens |
| #6 | −4.645 | 1.19 | | |
| #7 | inf. | 0.30 | 1.6233 | protection layer |
| #8 | inf. | — | | |

TABLE 10

| | SURFACE #1 SURFACE #3 | SURFACE #2 SURFACE #4 | SURFACE #5 | SURFACE #6 |
|---|---|---|---|---|
| K | 0.00 | 0.00 | −0.77 | 0.00 |
| $A_4$ | $-1.00 \times 10^{-3}$ | $-9.99 \times 10^{-4}$ | $1.46 \times 10^{-3}$ | $2.09 \times 10^{-2}$ |
| $A_6$ | $0.00 \times 10^{+0}$ | $9.70 \times 10^{-7}$ | $-5.38 \times 10^{-4}$ | $-4.89 \times 10^{-3}$ |
| $A_8$ | $0.00 \times 10^{+0}$ | $0.00 \times 10^{+0}$ | $-2.00 \times 10^{-4}$ | $9.68 \times 10^{-4}$ |
| $A_{10}$ | $0.00 \times 10^{+0}$ | $0.00 \times 10^{+0}$ | $-3.36 \times 10^{-5}$ | $-1.28 \times 10^{-4}$ |
| $A_{12}$ | $0.00 \times 10^{+0}$ | $0.00 \times 10^{+0}$ | $-5.50 \times 10^{-6}$ | $8.13 \times 10^{-6}$ |

FIGS. 27A and 27B show wavefront aberration under a condition shown in FIG. 26. As understood from FIG. 26, the coma due to the decentering of the objective lens 20 is compensated by inclining the first coma compensating element 31.

If the protection layer 11 of the optical disc 10 inclines by 10° with respect to the optical axis, due to the coma generated by this inclination, the wavefront aberration increases as shown in FIGS. 28A and 28B. By inclining the second coma compensating element 32 by −7.4° as shown in FIG. 29, the coma due to the inclination of the optical disc 10 is canceled by the coma due to the inclination of the second coma compensating element, thereby the wavefront aberration is compensated as shown in FIGS. 30A and 30B.

The present disclosure relates to the subject matter contained in Japanese Patent Application No. 2001-315557, filed on Oct. 12, 2001, which is expressly incorporated herein by reference in its entirety.

What is claimed is:

1. A coma compensating element having two refraction surfaces, the refraction surfaces providing no aberrations with respect to rays incident thereon perpendicularly, the refraction surfaces providing coma with respect to rays incident obliquely thereon, spherical aberration provided by the two refraction surfaces being the same quantity in opposite directions.

2. The coma compensating element according to claim 1, wherein each of the refraction surfaces is a rotationally symmetrical aspherical surface.

3. The coma compensating element according to claim 1, wherein cross sectional shapes of said two refraction surfaces are different.

4. The coma compensating element according to claim 1, wherein said coma compensating element has substantially no paraxial power.

5. An optical system for an optical pickup, comprising:

a light source that emits a light beam;

an objective lens that converges the light beam emitted by said light source on a data recording surface of an optical disc;

at least one coma compensating element having two refraction surfaces, the refraction surfaces providing no aberrations with respect to rays perpendicularly incident thereon, the refraction surfaces providing coma with respect to rays obliquely incident thereon, spherical aberration provided by the two refraction surfaces being the same quantity in opposite directions.

6. The optical system according to claim 5, wherein a central axis of said at least one coma compensating element is inclined with respect to an optical axis of said objective lens.

7. The optical system according to claim 5, wherein an angle of a central axis of said at least one coma compensating element with respect to an optical axis of said objective lens is adjustable.

8. The optical system according to claim 5, wherein said at least one coma compensating element includes first and second coma compensating elements.

9. The optical system according to claim 8, wherein an angle of a central axis of said first coma compensating element with respect to an optical axis of said objective lens is fixed, and wherein an angle of a central axis of said second coma compensating element with respect to the optical axis of said objective lens is adjustable.

10. The optical system according to claim 9, wherein said first coma compensating element moves integrally with said objective lens for tracking, and wherein said second coma compensating element does not move with said objective lens which is moved for tracking.

11. The optical system according to claim 5, wherein one of said at least one coma compensating element is configured to move integrally with said objective lens for tracking.

12. The optical system according to claim 5, wherein said at least one coma compensating element has substantially no paraxial power.

* * * * *